March 26, 1940.  W. A. KNAPP  2,194,980

BURNER APPARATUS FOR MANUFACTURING CARBON AND LAMP BLACK

Filed April 23, 1938  2 Sheets-Sheet 1

W. A. Knapp
INVENTOR.

BY C. A. Snow & Co.
ATTORNEYS.

March 26, 1940. W. A. KNAPP 2,194,980
BURNER APPARATUS FOR MANUFACTURING CARBON AND LAMP BLACK
Filed April 23, 1938 2 Sheets-Sheet 2

W. A. Knapp
INVENTOR.
BY *Cl Snow &Co.*
ATTORNEYS.

Patented Mar. 26, 1940

2,194,980

UNITED STATES PATENT OFFICE 2,194,980

BURNER APPARATUS FOR MANUFACTURING CARBON AND LAMP BLACK

William A. Knapp, Lubbock, Tex.

Application April 23, 1938, Serial No. 203,977

2 Claims. (Cl. 134—63)

This invention relates to apparatus for and a method of manufacturing carbon and lamp black, wherein either type of black may be produced from the same apparatus, either simultaneously, or one without the other. The invention aims, further, to provide a novel form of burner for controlling the flame by which the black, of whatever sort, is produced.

It is within the province of the disclosure to improve generally and to enhance the utility of devices of that type to which the present invention and apparatus appertains.

An object of my invention is to provide an improved burner apparatus for the manufacture of carbon and lamp black, which will be provided with suitable means for varying the characteristics of the burner flames, which includes means for adjusting the position of the burner elements with respect to the level of the fuel oil in the oil supply tank.

Another object of my invention is to provide an improved burner apparatus for the manufacture of carbon and lamp black, which will cooperate with a thermostat element positioned in the fuel oil reservoir, and being connected with a valve in the fuel intake line, whereby the inlet of additional fuel oil to the oil reservoir, as it contacts the burner elements, will cool said elements to keep the flames from the burner elements of a desired character and type.

A still further object is to provide a new and novel process wherein the heat of the low temperature flame produced by the burner can be utilized for heating the hydrocarbon liquid and expelling combustible gases therefrom for consumption with films of liquid withdrawn from a liquid container.

With the above and other objects in view, which will appear as the description proceeds, the invention resides in certain steps of the method and in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings which form a part of my application,

Like characters of reference are used throughout the following specification and the accompanying drawings to designate corresponding parts.

Figure 1:
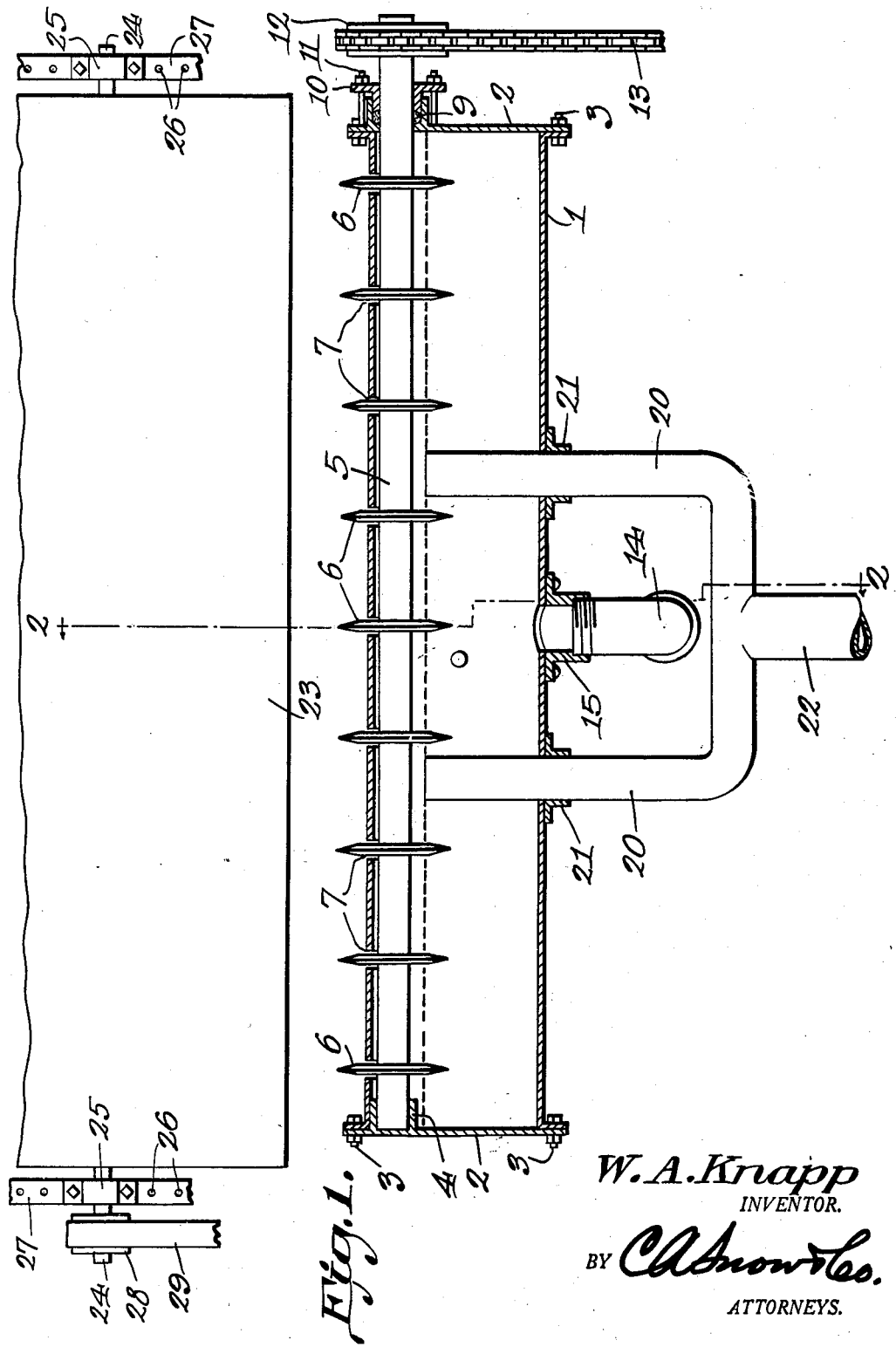
Figure 1 is a side elevation, partly in section of my improved burner apparatus for manufacturing carbon and lamp black.
Figure 3:
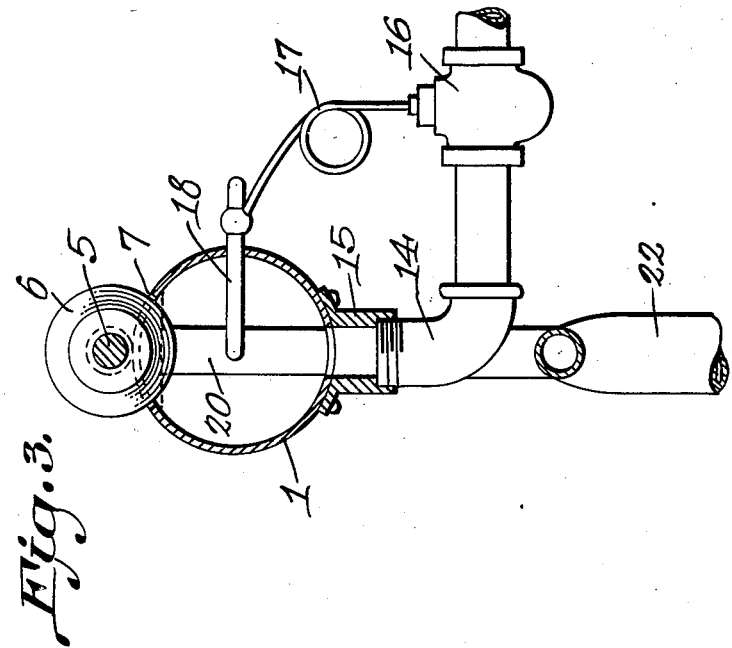
Figure 3 is a view corresponding to that shown in Figure 2, but showing the burner elements being mounted above the fuel oil supply tank, instead of being mounted within the confines of the tank.
Figure 2:
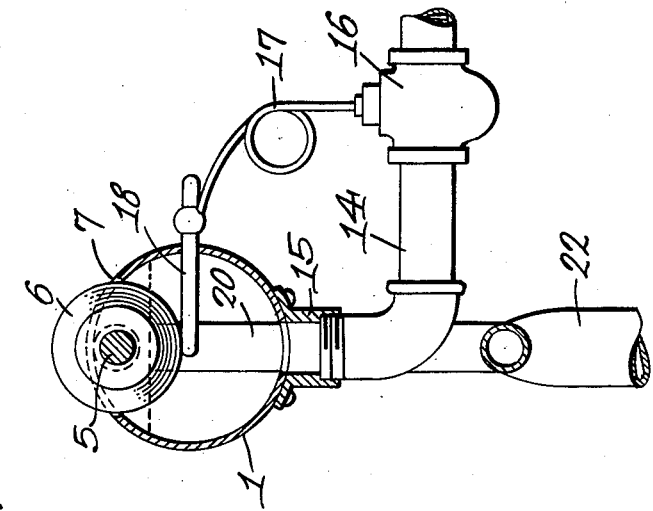
Figure 2 is a sectional view taken on line 2—2 of Figure 1.

In carrying out my invention, I provide a reservoir 1 for the fuel to be consumed, the fuel being waste oil from the crank cases of internal combustion engines or any other sort of hydrocarbon liquid. The reservoir 1 may be of any desired form but preferably it is of elongated cylindrical form shown in the drawings, and is provided with removable ends 2 secured to the reservoir 1 by means of the bolt 3. It is desired to withdraw the hydrocarbon liquid in thin films from the reservoir and one means provided for this purpose has been shown. In said structure a bearing 4 will be formed on the inside surface of one of the end plates 2, and is adapted to receive the shaft 5 upon which are mounted a plurality of burner disks 6 arranged in spaced relation to each other, and which extend up through slots 7 in the reservoir. A second bearing for the shaft 5 is formed on the outer surface of the other end plate 2, and is adapted to receive a packing material 9, which is held therein in the bearing by means of a sleeve 10, which firmly compresses the packing and is held in position by means of the bolt 11 extending into the shaft 10.

A sprocket wheel 12 will be positioned on the external end of the shaft 5, and will be driven through the medium of the sprocket chain 13, by means of any suitable motor or source of power (not shown). A fuel inlet pipe 14 will be connected to the bottom of the reservoir 1 adjacent its central portion, and is threaded into the nipple 15 carried by the said reservoir. An intake valve 16 is connected in series with the fuel supply line 14, and is connected through the tubing 17 with a suitable thermostat 18, which extends through the wall of the reservoir 1 and is adapted to be constantly covered by the fuel oil or hydrocarbon liquid at all times, and the operation of the intake valve is controlled by the thermostat, which is subject to temperature changes of the hydrocarbon liquid within the said reservoir 1.

The forked overflow pipes 20 extend through the fittings 21 and up into the interior of the reservoir 1 to any desired height. The forked overflow pipes terminate in an enlarged outlet pipe 22, which is adapted to carry the hydrocarbon liquid which overflows through the pipes 20 into any suitable supply tank where it may be fed again back into the reservoir 1.

Positioned above the burner apparatus, I have provided a depositing roll 23 which is supported upon a suitable shaft 24, which in turn is mounted in the vertically adjustable bearings 25, it being obvious from the drawings that the bearings may be raised or lowered by placing them in the desired openings 26 in the supporting standard 27. A pulley 28 will be mounted on one end of the shaft 24, and will be connected through the belting 29 to a suitable motor or source of power (not shown). It will be apparent that if I desire I may use a flat collecting plate in place of a depositing roll, or any other suitable means upon which the lamp or carbon black may be deposited. A suitable scraper, not shown, will be incorporated with the depositing roll or plate, whereby the lamp or carbon black may be removed and collected after the same has been deposited.

It will also be apparent that if desired, I may raise or lower the burner disks within the reservoir 1 for changing the flames from the burners to produce different qualities of black. Any carbon not collected on the collecting surface of the depositing roll could either be vented through openings in the top of the building in which the burner is located or could be conducted through conduits over the collecting surface to the outside of a building and precipitated and there collected.

From the foregoing description, it will be apparent that the character or quality of the carbon or lamp black can be regulated by either raising and lowering the disk burners toward the collecting roll, or the collecting roll may be raised or lowered with respect to the disk burners. The disk burners are formed with sharpened edges so as to produce an efficient flame which readily permits of the depositing of the black upon a closely positioned depositing roll.

The operation of my improved burner apparatus for the manufacturing of carbon and lamp black, will be as follows:

Assuming that the hydrocarbon liquid has been permitted to enter the reservoir 1 until it reaches the height of the overflow pipes 20, the motor which operates the rotating burners and the shaft upon which they are mounted, is started, whereupon the disk burners will pick up the hydrocarbon liquid from the reservoir, the lower end of said disk being submerged in the hydrocarbon liquid, and as the motor rotates the disk, a thin film of oil will be deposited upon the said disk burners, and the same may be ignited. After the disk has been lighted the heat from the same will naturally heat the hydrocarbon liquid within the reservoir, which is controlled by the thermostat connected to the inlet valve. The heated liquid will give off combustible gases which will flow around the disks and burn with those portions of the films of liquid outside of the reservoir and on the disks. The level of the hydrocarbon liquid in the reservoir is controlled by the length of the outlet pipes extending up into the interior of the said reservoir. The size and type of flame is controlled by the size and speed at which the disks are rotated. When the liquid first starts burning, sufficient heat will be produced from the flame to continue the vaporizing of the fuel.

If the heat in the reservoir should have a tendency to drop, the thermostat will act upon the inlet valve 16 closing off the valve and retarding the oil circulation. However, if the heat in the reservoir has a tendency to increase the thermostat would then open the valve 16 which would increase the oil circulation, sending a greater amount of cold fuel or liquid into the reservoir and creating a larger overflow. Should the inlet valve 16 be entirely closed the fuel in the reservoir would soon start to boil, but this is prevented by the continuous circulation of the oil through the reservoir.

As before mentioned, the space between the burner disks and the collecting roll is adjustable to suit any type of flame to produce the different qualities of carbon or lamp black.

Many minor changes in detail of construction may be resorted to. For example while rotating disks have been disclosed for transferring the films of liquid from the reservoir other movable means might be employed.

Having thus described my invention what I claim as new and desire to secure by Letters Patent of the United States is:

1. A burner for the production of carbon black, comprising a reservoir for liquid fuel having a slit in its upper portion, a disk supported for rotation and located in the slit, partly within and partly without the reservoir, the disk being thin enough to form a film of fuel and to prevent a dripping accumulation of fuel on the periphery of the disk, and means for rotating the disk, to cause it to carry a film of fuel from the reservoir, outwardly through the slit, the width of the slit approximating closely the thickness of the disk, thereby to form a burner orifice narrow enough so that, when the film burns at the orifice, the disk will be highly heated, and, when rotated, will heat the fuel in the reservoir.

2. A burner for the production of carbon black, constructed as set forth in claim 1, and wherein the disk is of substantially V-shape in cross section, at its periphery, thereby to bring about a more perfect drainage of fuel from the disk, and to promote the formation of a film on the disk.

WILLIAM A. KNAPP.